United States Patent [19]

Jünemann

[11] 4,431,355
[45] Feb. 14, 1984

[54] FASTENER FOR LINING PANELS

[75] Inventor: Dietrich Jünemann, Lorrach, Fed. Rep. of Germany

[73] Assignee: A. Raymond, Lorrach, Fed. Rep. of Germany

[21] Appl. No.: 298,370

[22] Filed: Sep. 1, 1981

[30] Foreign Application Priority Data

Sep. 15, 1980 [DE] Fed. Rep. of Germany ....... 3034729

[51] Int. Cl.³ .......................................... F16B 19/00
[52] U.S. Cl. .................................... 411/360; 411/15; 411/508
[58] Field of Search ............... 403/405; 411/508, 360, 411/15, 74, 57; 24/217 R, 208 A

[56] References Cited

U.S. PATENT DOCUMENTS

| | | | |
|---|---|---|---|
| 3,213,506 | 10/1965 | Fernberg | 24/217 R |
| 3,393,431 | 7/1966 | Saunders | 411/508 |
| 3,701,302 | 10/1972 | Pestka et al. | 411/15 |
| 3,916,756 | 11/1975 | Yoda | 24/217 R |
| 4,240,323 | 12/1980 | Kojima | 411/15 |

FOREIGN PATENT DOCUMENTS 1520155 8/1978 United Kingdom ............... 411/15

Primary Examiner—Wayne L. Shedd
Attorney, Agent, or Firm—Finnegan, Henderson, Farabow, Garrett & Dunner

[57] ABSTRACT

A device for detachably fastening an element having a first aperture onto a support panel of a motor vehicle having a second aperture. The device includes a bushing insertable into the second aperture, which bushing includes an exterior flange and resilient legs which cooperate to fix the bushing to the support member. The device further includes a plug which is insertable through the first aperture and into the bushing. The plug has a conically tapered bulge which cooperates with an elastic constriction in the bushing to fix the plug relative to the bushing and therefore the element relative to the support panel.

8 Claims, 5 Drawing Figures

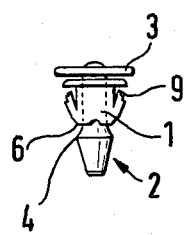
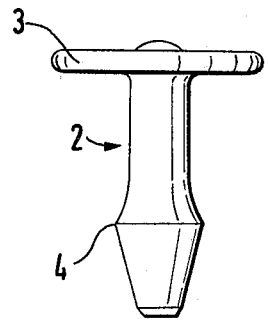
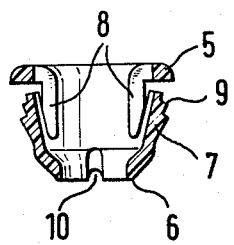
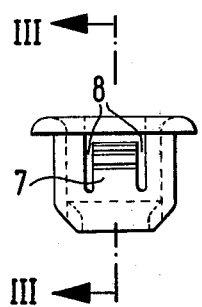
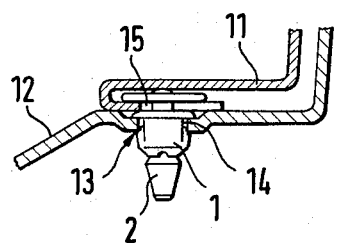

FASTENER FOR LINING PANELS

BACKGROUND OF THE INVENTION

1. Field of the Invention

The present invention relates to a fastener for detachably securing lining panels, strips of trim, or the like on support panels such as the body sheet metal of motor vehicles. The fastener includes a bushing made of a hard, elastic material insertable into an aperture in the support panel and a plug secured by a head to the lining panel. The plug includes a conically tapering bulge which can be forced into the bushing. A funnel-shaped constriction in the bushing corresponding to the bulge will elastically yield under the attachment force whereby the bulge can be axially fixed with respect to the constriction. The bushing includes a flange which rests on the support panel. The bushing is anchored to the rim of the aperture in the support panel by elastically compressible legs which cooperate with the flange.

2. Description of the Prior Art

In the past the attachment of lining panels to support panels ordinarily occurred in three operational steps. First, the bushing is forced into an aperture of the support panel. Second, the plug head is anchored to the lining panel. This anchoring step adds to the cost of the attachment operation. For example, a plug head might be inserted into a keyhole-shaped clearance in the lining panel. A matching support plate or fixture, parallel to and located underneath the lining panel and the head of the plug, might be secured to the lining panel in order to axially fix the plug in the keyhole. Finally, the plug can be forced into a funnel-shaped constriction in the bushing until a bulge of the plug snaps into position behind the constriction in the bushing. The backside of the bulge is tapered allowing the plug to be removed from the bushing when force is applied in the reverse direction. The taper on the backside of the bulge is generally steeper than the taper on the leading side of the bulge. More force is required, therefore, to extract the plug, than is required to insert the plug into the bushing.

3. Problems Presented by the Prior Art

This above-described fastening principle has been practiced for many years in the motor vehicle industry. The process of first putting the fastener parts in place on the respective panels and then mutually joining the fastener parts, however, requires extensive assembly time at the factory. This expenditure of assembly line time is one of the major drawbacks of the prior art fasteners.

SUMMARY OF THE INVENTION

The present invention overcomes the problems and disadvantages of the prior art by providing an attachment device which saves assembly time. The device eliminates the need for a separate element to secure the head of the plug to the lining panel. The device includes at least two resilient legs which are integrally attached to the leading edge of the bushing in an elastic manner. The resilient legs extend upward from the leading edge and outward from recesses in the bushing sidewall, terminating just below the flange.

This simple modification of the bushing enables the bushing to be premounted on the plug by the manufacturer and supplied as a common part with the plug. The invention thereby reduces the number of operational steps required at the assembly line to two. First, the plug head of the fastener assembly is inserted into the keyhole of the lining panel. Then, the bushing of the fastener assembly is forced into the second aperture of the support panel where it snaps into position. If it should later be desired to detach the lining panel, the plug can be forcibly withdrawn and the bushing then remains in the support panel.

The present invention also offers the advantage that the bushing flange serves the function of the support plate for the plug head thereby eliminating the need for the support plate. In this manner, economically significant material savings and savings of assembly time are achieved.

Thus, an object of the invention is to provide an improved attachment device that shortens the time of assembly at the assembly line, while retaining the advantages of the prior ary fasteners.

Another object is to minimize the number of parts required to attach a lining panel to a support panel and to provide a device which can be economically produced.

An additional object is to provide a device which can be used with support panels of varying thickness.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achive the objects and in accordance with the purpose of the invention, as embodied and broadly described herein, the invention comprises a device for detachably fastening an element having a first aperture onto a support panel of a motor vehicle having a second aperture comprising a bushing with a leading edge insertable into the second aperture, the bushing including a flexible constriction located on the interior sidewall of the bushing proximate to the leading edge, an exterior flange opposite the leading edge, an exterior bushing sidewall forming at least two recesses, and at least two resilient legs for cooperating with the flange to fix the bushing to the support member, each of the resilient legs being fixed to the leading edge of the bushing in an elastic manner and projecting upward from the leading edge and outward from a corresponding one of the recesses in the bushing and terminating below the flange, and a plug, a portion of which is insertable through the first aperture, the plug having a head larger in diameter than at least a portion of the first aperture for resting on the rim of the first aperture and cooperating with the flange of the bushing to axially fix the plug relative to the element, a neck integral with the head, and a conically tapered bulge integral with the neck positioned opposite the head, the bulge having a maximum diameter greater than that of the constriction in its unstressed condition and being forcibly insertable through said constriction.

The device in its preferred form includes a plurality of stepped support surfaces substantially parallel to the plane of the flange and positioned along the exterior edge of the resilient legs to facilitate fixing the bushing to support members of varying thicknesses.

It is to be understood that both the foregoing general description and the following detailed description are exemplary and explanatory only, and are not restrictive of the invention, as claimed.

The accompanying drawings, which are incorporated in and constitute a part of the specification, illustrate one embodiment of the invention and together with the description, serve to explain the principles of the invention.

BRIEF DESCRIPTION OF THE DRAWINGS

FIG. 1 is a side view of the fastening device consisting of a plug and a bushing in the supplied state.

FIG. 2 is a side view of the plug on a larger scale.

FIG. 3 is a sectional view of the preferred embodiment of the bushing taken along line III—III of FIG. 4.

FIG. 4 is a side view of the preferred embodiment of the bushing.

FIG. 5 is a partial sectional view of the preferred embodiment of the invention illustrated in the installed state.

DESCRIPTION OF THE PREFERRED EMBODIMENT

Reference will now be made in detail to the present preferred embodiment of the invention, an example of which is illustrated in the accompanying drawings.

The preferred embodiment of the invention is shown generally in FIG. 1. The fastener consists essentially of a bushing 1 and a cooperating plug 2. Both elements are made from a pourable, hard-elastic material such as polyacetal resin. The plug 2 includes at its end a head 3 used for axially fixing the plug to a lining panel 11 (FIG. 5). The plug comprises at the end of its neck opposite the head a conically tapered bulge 4 (FIG. 2). The bushing is provided with a corresponding funnel-shaped constriction 6 with an inner diameter less than the outer diameter of the bulge 4. The constriction is dimensioned so that the plug 2 can be forced through the bushing 1 by a corresponding elastic yielding of the constriction 6 as the bulge 4 passes through the constriction 6. The bulge 4 is fixed axially with respect to bushing 1 when this bushing is placed in an aperture 14 of the support panel 12.

In order to secure the bushing 1 to the support panel 12, the bushing is provided with a flange 5 and at least two resilient legs 7. As shown in FIG. 5, the flange 5 and the head 3 of the plug cooperate to axially fix the plug relative to the lining panel 11. The resilient legs 7 are integrated in an elastic manner at the leading edge 16 of bushing 1 and project upward from the leading edge and outward from the sidewall of the bushing 1. The legs 7 are capable of free inward elastic motion in recesses 8 of the bushing sidewall and therefore allow the insertion of the bushing 1 into the aperture 14. The resilient legs 7 include a plurality of stepped support surfaces 9 which are substantially parallel to the plane of the flange 5. These stepped surfaces can reliably rest on the rim 13 of the aperture 14 in the support panel 12 even when the support panel 12 varies in thickness.

In order to reliably assure that the bushing 1 has sufficient holding force, the funnel-shaped constriction 6 is arranged in the inner sleeve of the bushing proximate to the leading edge 16 and below the elastic legs 7. If necessary, it is possible to arrange further elastic legs 7 at the leading edge 16 of the bushing 1 in a uniformly spaced manner.

Again, the constriction 6 as shown in the preferred embodiment can be made elastic by means of two or more slits 10, depending on the material strength. The slits 10 are evenly distributed about the inner periphery of the constriction, thereby affording the constriction flexibility, with attendant advantageous effects for manual assembly.

The advantage of the invention is that the plug 2 and bushing 1 can be preassembled by the manufacturer whereby one operational step, material for the support plate, and valuable assembly line time are saved. Moreover, the flange 5 of the bushing 1 can, after preassembly of the bushing 1 and the plug 2, be used simultaneously as a shoulder for the head 3 of the plug. This can be accomplished by forcing the flange 5 into the keyhole-shaped clearance—or a funnel-shaped clearance 15 in the preferred embodiment—below the panel 11. In the preferred embodiment the entire fastener assembly, however, is still capable of moving parallel to panel 11. This is essential as there are always several fastening clamps of this type being forced simultaneously into corresponding apertures 14 in the support panel 12, so that the fastening units 1, 2 themselves must correct for any slight positional deviation of the apertures 14. When all of the bushings 1 have been pressed into their respective apertures 14 and have snapped into position by means of their resilient legs 7, substantial force is required to remove the lining panel 11. If desired, however, the lining panel 11 is detachable from the support panel 12. If detached, the bushings 1 remain in the apertures 14, and only the plugs 2 are pulled out of the constrictions 6.

Other embodiments of the invention will be apparent to those skilled in the art from consideration of the specification and practice of the invention disclosed herein. It is intended that the specification and examples be considered as exemplary only, with a true scope and spirit of the invention being intended by the following claims.

What is claimed is:

1. A fastener for detachably securing an element having a first aperture to a support member having a second aperture comprising:

a bushing, with a leading edge inserted into the second aperture, said bushing including a flexible constriction located on the interior sidewall of the bushing proximate to the leading edge, an exterior flange opposite said leading edge, an exterior bushing sidewall forming at least two recesses, and at least two resilient legs which cooperate with said flange and fix the bushing to the support member, each of said resilient legs being fixed to said leading edge in an elastic manner and projecting upward from said leading edge and outward from a corresponding one of said recesses in said bushing and terminating below said flange; and a plug, a portion of which is insertable through the first aperture, said plug having a head that is larger in diameter than at least a portion of the first aperture, rests on the rim of the first aperture and cooperates with said flange of said bushing, axially fixing said plug relative to the element, a neck integral with said head, and a conically tapered bulge integral with said neck and positioned opposite said head, said bulge having a maximum diameter greater than that of said construction in its unstressed condition, said bulge being forcibly inserted through said constriction.

2. The fastener of claim 1, wherein the resilient legs include a plurality of stepped support surfaces substantially parallel to the plane of said flange and positioned along the exterior edge of the resilient legs, at least one of said stepped support surfaces fixing the bushing to the support member.

3. The fastener of claim 1, wherein the elastic constriction is funnel-shaped and is positioned below the resilient legs.

4. The fastener of claim 1, wherein the constriction includes at least two longitudinal slits uniformly distributed about the inner periphery of the constriction.

5. The fastener of claim 1, wherein the resilient legs are uniformly distributed about the periphery of the leading edge.

6. The fastener of claim 1 wherein said resilient legs are uniformly distributed about the periphery of the leading edge and include a plurality of stepped support surfaces substantially parallel to the plane of said flange and positioned along the exterior edge of the resilient legs, at least one of said stepped support surfaces fixing the bushing to the support member and wherein said elastic constriction is funnel-shaped, is positioned below the resilient legs, and includes at least two longitudinal slits uniformly distributed about the inner periphery of the constriction.

7. A device for detachably fastening an element having a first aperture onto a support panel of a motor vehicle having a second aperture comprising:
a bushing with a leading edge insertable into the second aperture, said bushing including a flexible constriction located on the interior sidewall of the bushing proximate to the leading edge, an exterior flange opposite said leading edge, an exterior bushing sidewall forming at least two recesses, and at least two resilient legs which cooperate with said flange and fix the bushing to the support panel, each of said resilient legs being fixed to the leading edge in an elastic manner and projecting upward from said leading edge and outward from a corresponding one of said recesses in said bushing and terminating below said flange; and
a plug, a portion of which is inserted through the first aperture, said plug having a head that is larger in diameter than at least a portion of the first aperture, rests on the rim of the first aperture and cooperates with said flange of said bushing, axially fixing the plug relative to the element, a neck integral with said head, and a conically tapered bulge integral with said neck positioned opposite said head, said bulge having a maximum diameter greater than that of said constriction in its unstressed condition, said bulge being forcibly inserted through said constriction.

8. The fastener of claim 7 wherein the elastic constriction is funnel-shaped, is positioned below the resilient legs, and includes at least two longitudinal slits uniformly distributed about the inner periphery of the constriction, and the elastic legs are uniformly distributed about the periphery of the leading edge and include a plurality of stepped support surfaces substantially parallel to the plane of said flange and positioned along the exterior edge of the elastic legs, at least one of said stepped support surfaces fixing the bushing to the support panel.

* * * * *